United States Patent Office

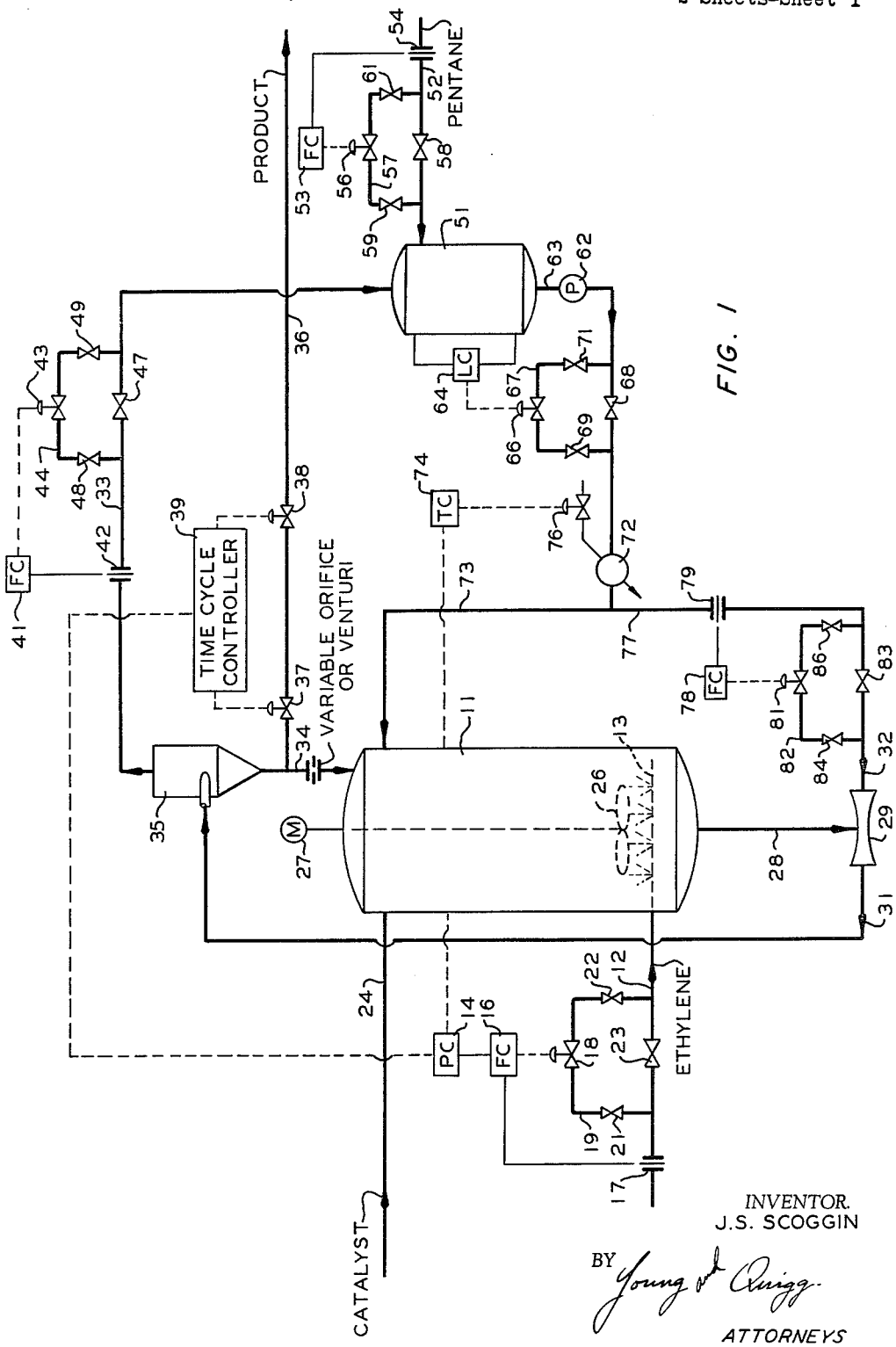

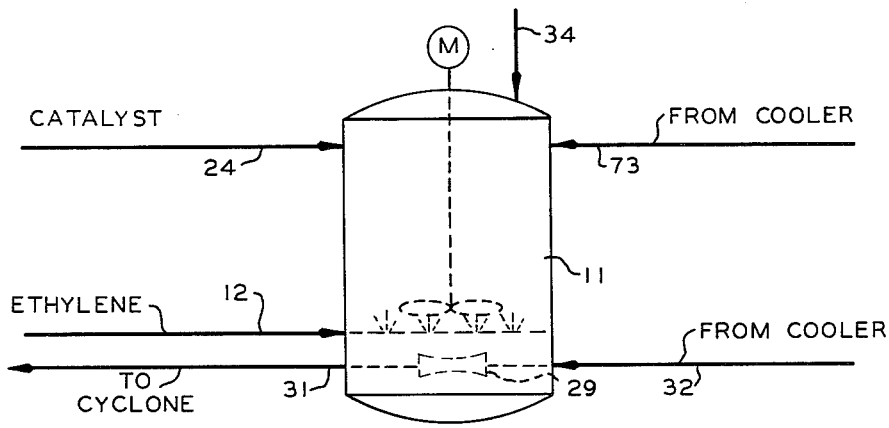
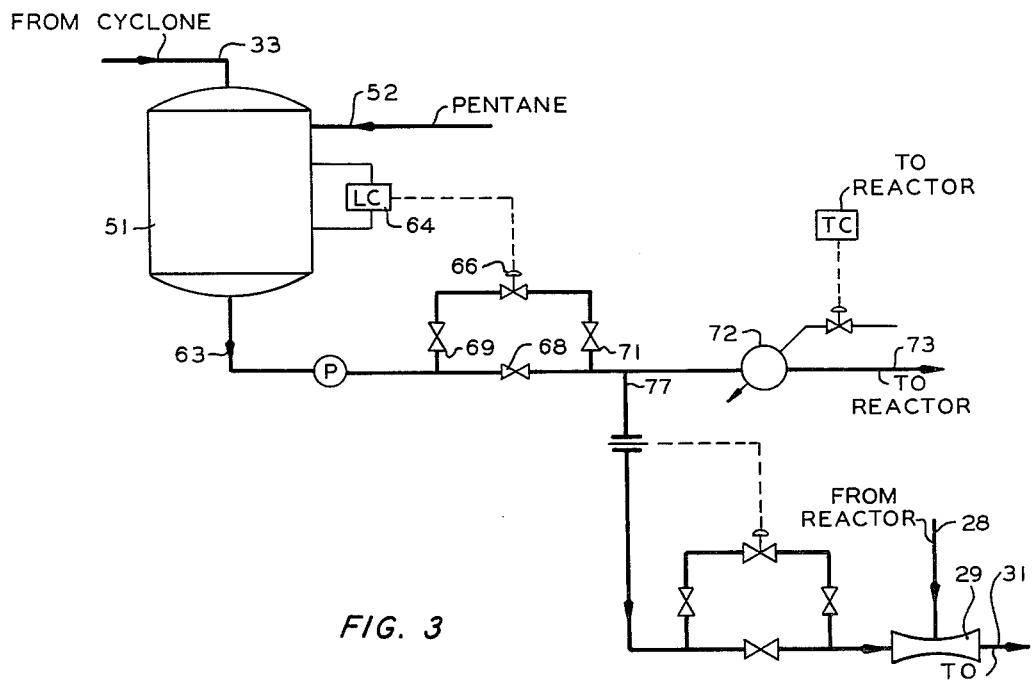

3,227,526
Patented Jan. 4, 1966

3,227,526
REACTOR SYSTEM
Jack S. Scoggin, Bartlesville, Okla., assignor to Phillips Petroleum Company, a corporation of Delaware
Original application Nov. 13, 1958, Ser. No. 773,655, now Patent No. 3,087,917, dated Apr. 30, 1963. Divided and this application Feb. 25, 1963, Ser. No. 260,657
5 Claims. (Cl. 23—288)

This application is a division of Serial No. 773,655, filed November 13, 1958, now Patent 3,087,917.

This invention relates to the production of polymers which are in the form of particles. In one aspect, it relates to a reaction system for use in a polymerization process in which the polymer product produced is in solid particle form.

It has recently been discovered, as disclosed by J. P. Hogan and R. L. Banks in U. S. Patent No. 2,825,721, issued on March 4, 1958, that unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The olefin feed used in the polymerization is at least one olefin selected from a class of 1-olefins having a maximum of 8 carbon atoms per molecule and no branching nearer the double bond than the 4-position. Examples of olefins which can be polymerized by the described method include ethylene, propylene, 1-butene, 1-pentene, and 1,3-butadiene. Copolymers, such as ethylene-propylene copolymers and ethylene-butadiene copolymers, can also be prepared by utilizing the chromium oxide-containing catalyst.

In one method of operation, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule, can be advantageously utilized in the practice of the invention. Examples of paraffins which can be used include propane, n-butane, n-pentane, isopentane, n-hexane, n-decane, 2,2,4-trimethylpentane (isooctane), and the like. Another class of hydrocarbons which can be used are naphthenic hydrocarbons having from 4 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only constituents on the ring. Thus, the preferred naphthenic hydrocarbons are cyclopentane, cyclohexane, methylcyclopentane, methylcyclohexane, and the dimethylcyclopentanes and the dimethylcyclohexanes. It is also disclosed that mixtures of naphthenic and paraffinic hydrocarbons can be used as the reaction medium.

When utilizing butane and higher paraffinic hydrocarbons as the reaction medium, the polymerization temperature is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit would be between 190 and 230° F., depending upon the composition of the mixture.

Further modification of the process comprises contacting ethylene in a reaction zone with a suspension of a chromium oxide-containing catalyst in a liquid hydrocarbon selected from the group consisting of paraffinic and naphthenic hydrocarbons, the contacting occurring at a temperature in the range of 150 to 250° F. when the liquid hydrocarbon is a paraffin, and at a temperature in the range of 150 to 190° F. when the liquid hydrocarbon is a naphthenic hydrocarbon; removing a mixture of liquid hydrocarbon and polymer from the reaction zone; and separating polymer from the mixture. More desirably, the polymerization is carried out at a temperature in the range of 150 to 225° F. when the liquid hydrocarbon is a paraffin and in the range of 150 to 180° F. in the case of cycloparaffins. One of the important advantages of the process resides in the fact that it is unnecessary to treat the polymers to remove the catalyst. However, where desired, the polymer can be treated so as to separate catalyst from the polymer.

The catalyst utilized in the above-described process comprises as an essential ingredient, chromium oxide, preferably including a substantial amount of hexavalent chromium. The chromium oxide is ordinarily associated with a least one other oxide, particularly at least one oxide selected from the group consisting of silica, alumina, zirconia and thoria. The chromium oxide content of the catalyst can range from 0.1 to 10.0 weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method of preparing the silica-alumina composite undoubtedly affects to some extent the catalyst activity, it appears that composites prepared by any of the prior art processes for preparing such catalytically active composites, e.g., coprecipitation or impregnation, are operative for the process. Methods for the preparation and activation of this catalyst are described in detail in the Hogan and Banks patent referred to hereinbefore. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F. under non-reducing conditions, for example, with a stream of substantially anhydrous (dew point preferably 0° F. or lower) oxygen-containing gas, such as air. A commercial microspheroidal silica-alumina composite can also be advantageously employed in the preparation of the catalyst.

The catalyst is preferably employed in the form of a relatively fine powder so that it may be readily maintained in suspension or as a slurry in the liquid hydrocarbon. The catalyst powder generally has a particle size of 100 mesh and smaller, preferably 100 microns and smaller. While the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will generally be in the range of 0.01 to 5 weight percent, preferably 0.5 to 1.0 weight percent, based upon the total amount of the reaction medium, i.e., liquid hydrocarbon diluent, present in the reaction zone. While there is no critical residence or contact time for practicing the process, the contact time will generally be in the range of 0.1 to 12 hours, preferably from 1 to 5 hours. The pressure in the reaction zone is generally that sufficient to maintain the liquid hydrocarbon diluent in the liquid phase and will ordinarily range from about 100 to about 700 p.s.i.

The polymerization is an exothermic reaction so that it becomes necessary during the process to make provision for the removal of heat from the reaction zone. Reactor systems which utilize jacketed reactors have been found to be unsatisfactory, probably because of the poor heat transfer properties of the polymer slurry. When employing such conventional systems, the reactor becomes fouled or plugged, making it necessary to shut down and clear the reactor before the process can be resumed. In accordance with this invention, a novel method and apparatus are provided which make it possible to control the polymerization temperature within rather narrow limits. As a result, the reactor can be operated over extended periods of time without becoming fouled or plugged.

It is an object of this invention to provide an improved reactor system for use in a polymerization process in which the polymer product formed is in solid particle form.

A further object of the invention is to provide an improved method for controlling the temperature of a polymerization reaction.

A still further object of the invention is to provide an improved method for removing a slurry of solid materials in a liquid from a closed vessel.

Other and further objects and advantages of the invention will become apparent to those skilled in the art upon consideration of the accompanying disclosure.

The present invention is concerned primarily with an improved apparatus for polymerizing olefins so as to produce polymers which are in solid particle form. However, it is to be understood that the invention is also applicable to other reactions which involve the maintenance of a desired temperature in a chamber containing a slurry of solids in a liquid. Broadly speaking, in a process in which an olefin is contacted with a catalyst in a polymerization zone in the presence of a diluent and solid polymer in particle form is thereby produced, the invention resides in the improvement which comprises withdrawing a slurry comprising polymer particles and diluent from the polymerization zone, separating diluent from the slurry, passing at least a portion of the separated diluent through a cooling zone, and introducing cooled diluent into the reaction zone. By controlling the temperature of the diluent so introduced, it is possible to maintain a desired temperature within the polymerization zone. In accordance with a preferred embodiment of the invention, a portion of the diluent is employed as the motive fluid to operate a jet pump which functions to remove slurry from the reaction zone.

In one modification, the apparatus of this invention comprises a closed reaction vessel, a jet pumping means, the suction of which is in communication with the reaction vessel, a line connecting the discharge of the pumping means to a cyclone separation means, a line connecting the lower portion of the cyclone separation means to the reaction vessel, a product withdrawal line connected to the last-mentioned line, a line connecting the upper portion of the cyclone separation means to a surge tank, and a line containing a cooling means having one end connected to the lower end of the surge tank and its other end connected to two lines which are separately connected to the reaction vessel and to the inlet of the jet pumping means.

A more complete understanding of the invention can be obtained by referring to the drawing, in which FIGURE 1 is a flow diagram illustrating a preferred embodiment of the present invention;

FIGURE 2 is a flow diagram illustrating a modification of the invention; and

FIGURE 3 is a flow diagram illustrating another modification of the invention.

As shown in FIGURE 1, ethylene is introduced into closed reactor 11 through line 12. A sparger 13, positioned in the lower portion of reactor 11 and connected to line 12, provides means for releasing the ethylene within the reactor. It is to be understood that mixtures of ethylene with other unsaturated hydrocarbons, e.g., mixtures of ethylene with minor amounts of higher 1-olefins, such as propylene, 1-butene, 1-pentene, 1-hexene, and the like, can be polymerized in accordance with this process. Ethylene is introduced into the reactor at a rate such as to maintain a desired pressure within the reactor. This pressure is generally in the range of 100 to 700 p.s.i. This control of the rate of ethylene introduction is accomplished through the operation of pressure recorder controller 14 which is operatively connected to reactor 11 and to a pneumatic set mechanism with which flow recorder controller 16 is provided. Flow recorder controller 16 is operatively connected to an orifice 17 in line 12 and to a motor valve 18 provided in bypass line 19. In a normal operation, the ethylene flows through bypass line 19, valves 21 and 22 in this line being open with valve 23 in line 12 being closed. If it is not desired to employ the control system, valves 21 and 22 are closed while valve 23 is allowed to remain open. When employing the control devices, pressure recorder controller 14 is given an index setting corresponding to the pressure which it is desired to maintain within reactor 11. The signal corresponding to the pressure within reactor 11 supplied by controller 14 is furnished to the pneumatic set mechanism of flow recorder controller 16. The pneumatic set mechanism functions to set the index of flow recorder controller 16 so that the signal furnished by this instrument is proportional to the ethylene flow rate necessary to give the desired pressure corresponding to the index setting of pressure recorder controller 14. The signal from controller 16 is supplied to motor valve 18 which is thereby operated so as to give the desired rate of ethylene flow.

A catalyst, preferably having a particle size of 100 microns or smaller, is added to reactor 11 by means of line 24. The catalyst is usually added to the reactor in the form of a slurry of catalyst in the diluent which in this specific embodiment is normal pentane. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.0 weight percent chromium in the form of chromium oxide of which about half is in the form of hexavalent chromium.

The ethylene entering the system through inlet line 12 is intimately contacted with the catalyst suspension or slurry in reactor 11. A suitable stirring means 26, driven by motor 27, is provided to facilitate contacting and to maintain the catalyst in suspension in the reaction medium. As mentioned hereinbefore, normal pentane serves as the reaction medium in the embodiment being described although other hydrocarbons can be utilized. The reaction zone is maintained at a temperature such that the polymer produced is substantially insoluble in the normal pentane and is in solid particle form. When utilizing a paraffinic hydrocarbon, such as normal pentane, the temperature is in the range of about 230° F. and below, preferably 225° F. and below. When naphthenic hydrocarbons are employed, the temperature is in the range of about 190° F. and below, preferably about 180° F. and below. While there appears to be nothing critical about the lower temperature at which the polymerization is carried out, as a practical matter, it is desirable in the case of paraffins and cycloparaffins that the temperature not be below 150° F. The present invention provides an improved method for maintaining the reaction temperature in the aforementioned ranges as will be described in more detail hereinafter.

The reactor effluent which is withdrawn through line 28 comprises a mixture of solid polymer particles containing catalyst, normal pentane, and small amounts of unreacted ethylene. Since the reaction is carried out at a temperature such that the polymer produced is substantially insoluble in the normal pentane, only a small amount of light polymer will be dissolved in the reaction medium. Because the reactor effluent is in the form of a slurry, it has been found that conventional pumping means cannot be satisfactorily utilized to handle this material. Accordingly, in the practice of the instant invention, a jet pump, such as ejector 29, is employed to withdraw the slurry from the reactor and to circulate same through line 31. Ejectors which can be suitably utilized can be obtained from the Penberthy Manufacturing Company, Detroit, Michigan. Line 28 is attached to the suction of the ejector while line 31 is connected to its discharge end. Motive fluid enters the ejector through line 32 and passes through the nozzle of the ejector which converts the fluid pressure into a high velocity jet stream. Slurry from reactor 11 is caused to flow through line 28 into the ejector because of the reduction of pressure therein caused by the flow of the motive fluid through the ejector nozzle. The slurry is entrained in the motive fluid and is thereafter discharged from the ejector under pressure. The source of the motive fluid supplied through line 32 will be discussed in more detail hereinafter.

In a preferred modification of the invention, as illustrated in FIGURE 2, the ejector is shown as being disposed within the lower portion of the reactor. Identical reference numerals have been used in FIGURE 2 to designate elements previously described in conjunction with FIGURE 1. The slurry enters ejector 29 directly through its suction opening, thereby eliminating the need of a connecting line as in the apparatus of FIGURE 1. Furthermore, because of the turbulence created in the reactor by so positioning the ejector, a more efficient mixing of the reactor materials is obtained.

Returning again to FIGURE 1, the slurry leaving the discharge end of ejector 29 flows through line 31 and enters cyclone separator 35. In the cyclone separator, diluent, which is separated from the slurry, is taken overhead through line 33. A concentrated polymer slurry, which leaves the cyclone separator through line 34, flows by gravity into reactor 11. Line 34 is provided with means, such as a variable orifice or venturi, whereby the amount of material flowing in that line can be varied.

Line 36 connected to line 34 provides means for withdrawing product from this latter line. Positioned in line 36 are two full opening valve means 37 and 38. The term "full opening valve means" is used to designate a valve which is to be operated wide open or fully closed. Plug valves can be advantageously employed as well as ball valves, such as those manufactured by the Jamesbury Corporation of Worcester, Massachusetts. This type of valve is used in the practice of this invention since it offers no constriction to flow when in an open position, thereby eliminating flashing and substantially obviating valve erosion because of the short contact time of the moving valve parts with the flowing materials. Valves 37 and 38 are each operatively connected to time cycle controller 39 which functions to open and close the valves in a predetermined manner. Pressure recorder-controller 14, which is operatively connected to the reactor 11 and to time cycle controller 39, functions to control the rate at which the time cycle controller opens and closes the valves. In any sequence of operation, valve 37 is initially fully open while valve 38 is closed. Thereafter, valve 37 is closed while valve 38 is opened. This permits the flow of concentrated polymer slurry to pass through line 36, the amount of material in one cycle of operation of the valves being equal to the volume of line 36 between the two valves. Thereafter, valve 38 is closed while valve 37 is opened, permitting concentrated slurry to fill line 36 up to valve 38. The time cycle controller operates to control the frequency with which the valves are opened and closed in accordance with the pressure within the reactor. Thus, if the pressure in the reactor increases above the indext setting given to pressure recorder-controller 14, in accordance with the signal supplied by the controller to the time cycle controller, this latter instrument operates to increase the frequency with which the valves are opened and closed. In this manner, an increased amount of concentrated slurry is removed from the system through line 36 thereby causing the pressure in the reactor to decrease. When the pressure in reactor 11 decreases below the setting given pressure recorder-controller 14, the time cycle controller is caused to operate so as to decrease the frequency with which valves 37 and 38 are opened and closed, thereby cutting back on the amount of concentrated slurry withdrawn through line 36. The concentrated slurry in line 36 is thereafter passed to suitable equipment for the separation of polymer and normal pentane and for further processing of the polymer product. Filtration equipment, fractionators and dryers are usually included in the installation which performs this separation.

As previously mentioned, normal pentane is recovered from the top of cyclone 35 through line 33. A flow recorder-controller 41 operatively connected to an orifice 42 in line 33 and to motor valve 43 in bypass line 44 provides means for controlling the rate of flow of the material in line 33. When this control equipment is being utilized, valve 47 in line 33 is closed while valves 48 and 49 in line 44 are open. The stream containing primarily normal pentane flows through line 33 into surge tank 51. Line 52 connected to the surge tank provides means for supplying make-up normal pentane to the system. The rate at which this diluent is furnished is controlled by means of flow recorder-controller 53 which is operatively connected to an orifice 54 in line 52 and to a motor valve 56 in bypass line 57. When operating with this control system, valve 58 in line 52 remains closed while valves 59 and 61 are open.

The diluent normal pentane is pumped from the bottom of surge tank 51 by means of pump 62 which is positioned in line 63. Normal pentane is withdrawn from the surge tank at a rate such as to maintain a desired level in that tank. This is accomplished through the operation of liquid level controller 64 which is operatively connected to surge tank 51 and to a motor valve 66 provided in bypass line 67. When operating with the liquid level controller, valve 68 in line 63 is closed while valves 69 and 71 in the bypass line are open. The normal pentane stream withdrawn from the surge tank through line 63 is thereafter passed through an indirect heat exchange means such as cooler 72.

As discussed hereinbefore, it has been found that conventional reactor systems which utilize jacketed reactors cannot be satisfactorily employed in the practice of the instant process. Such reactors have a tendency to become fouled so that it is necessary to shut down the system and clean out the reactor before the process can be continued. The problem is complicated by the fact that the reactor effluent recovered from the reactor is in the form of a slurry of polymer particles in the diluent. Such a material cannot be satisfactorily handled with conventional equipment employing moving parts because of the erosive nature of the material. Also, small polymer particles and catalyst tend to collect on moving parts, such as pump wear rings, and in time a fused mass of polymer may form, thereby fouling the equipment. From the foregoing description, it is seen that in accordance with the instant invention a jet pump is employed to remove the slurry from the reactor and that a diluent stream is thereafter separated from the slurry in a cyclone separator. In accordance with this invention, the diluent stream so separated from the slurry is cooled and then employed to remove heat from the reactor. By operating in this manner, it becomes possible to control the temperature within the reactor within rather narrow limits.

After passing through cooler 72, a portion of the normal pentane is flowed through line 73 into reactor 11. The amount of normal pentane passed into the reactor through line 73 is dependent on the setting given flow recorder-controller 78 which controls the rate of flow of material in line 77. It is to be understood that the flow recorder-controller could be utilized to control the flow of material in line 73 instead of in line 77. While the entire amount of normal pentane withdrawn from surge tank 51 is shown as passing through cooler 72, in a preferred modification, only that portion to be introduced into reactor 11 is flowed through the cooler, the remainder being passed directly to ejector 29. This modification of the invention is shown in FIGURE 3 in which identical reference numerals have been used to designate elements corresponding to those depicted in FIGURE 1. As seen in FIGURE 3, line 77 is connected to line 63 from surge tank 51 at a point upstream from the cooler so that the normal pentane supplied to ejector 29 does not pass through the cooler.

The temperature of the normal pentane charged to the reactor through line 73 is adjusted so as to maintain a desired temperature in the reactor. This is accomplished by the utilization of a temperature recorder-controller 74 which is operatively connected to reactor 11 and to a motor valve 76 positioned in the coolant introduction line of cooler 72. The temperature recorder-controller operates to control the rate at which coolant is supplied to cooler 72 in accordance with the temperature within the reactor. If the reaction temperature increases above the index setting given temperature recorder-controller 74, the signal supplied by the controller to motor valve 76 causes this valve to be opened to a greater extent, thereby permitting additional coolant to be supplied to cooler 72. When the temperature within reactor 11 decreases below the index setting given to controller 74, this instrument operates so as to cut back on the amount of coolant supplied to the cooler. It is seen that by operating in this manner, it is possible to maintain any desired temperature within reactor 11.

A portion of the normal pentane stream flowing through line 63 passes through line 77 which is attached to line 32. This latter line, as described hereinbefore, is connected to the inlet end of ejector 29. It is thus seen that the normal pentane used as a motive fluid for ejector 29 is a portion of the material recovered overhead from cyclone separator 32 through line 33. The rate at which normal pentane is introduced into ejector 29 is controlled by flow recorder-controller 78 which is operatively connected to an orifice 79 in line 77 and to motor valve 81 in bypass line 82. Valve 83 in line 32 is closed and valves 84 and 86 are opened during the normal operation of the control system.

The polymers produced in accordance with the above-described process have utility in applications where solid plastics are used. They can be molded to form a variety of articles of any desired shape, such as bottles and other containers for liquids. Also, they can be formed into pipe or tubing by extrusion.

A more complete understanding of the invention may be obtained by referring to the following illustrative example, which is not intended however, to be unduly limitative of the invention.

EXAMPLE

Apparatus similar to that illustrated in FIGURE 1 of the drawing is used in the polymerization of ethylene. The catalyst employed is prepared by the impregnation of a 50 to 70 mesh, silica-alumina coprecipitated composite with an 0.76 molar chromium trioxide solution. The silica-alumina composite comprises 90 weight percent silica and 10 weight percent alumina. The resulting composite is dried and activated with dry air for five hours at 950° F. The final catalyst contains 2.0 weight percent chromium oxide calculated as chromium.

The polymerization is carried out at a temperature of about 200° F., using normal pentane as the solvent. A pressure recorder-controller operatively connected to the reactor and to a flow recorder-controller connected to a motor valve in the ethylene feed line operates to maintain a reactor pressure of about 450 p.s.i.a.

The ejector pumps a slurry of polymer and normal pentane from the bottom of the reactor into a cyclone separator. The normal pentane recovered from the top of the cyclone separator is subsequently cooled, and a portion of this stream is returned to the reactor. This normal pentane stream is supplied to the reactor at a temperature such that the polymerization temperature is maintained at all times at about 200° F. The other portion of the normal pentane stream is employed as the motive fluid for the ejector. A concentrated polymer slurry is recovered from the lower portion of the cyclone separator, and a portion of this material is withdrawn as the product of the process. The other portion of the concentrated slurry is flowed by gravity into the reactor.

The results of this experiment are set forth hereinbelow in the table in which the numerals in parentheses refer to the reference numerals of the various lines shown in FIGURE 1. The flow rates shown in the table are expressed in pounds per hour of the listed materials.

Table

| | Ethylene | Pentane | Polymer | Catalyst | Total, lb./hr. |
|---|---|---|---|---|---|
| Reactor effluent (28) | 242 | 2,815 | 703 | 0.703 | 3,760.703 |
| Motive fluid to ejector (32) | 251 | 2,960 | | | 3,211 |
| Ejector discharge (31) | 493 | 5,775 | 703 | 0.703 | 6,971.703 |
| Cyclone overflow (33) | 382 | 4,465 | | | 4,847 |
| Polymer product (36) | 3 | 35 | 19 | 0.019 | 57.019 |
| Cyclone underflow to Reactor (34) | 108 | 1,275 | 684 | 0.684 | 2,067.684 |
| Makeup diluent (52) | | 35 | | | 35 |
| Diluent to cooler (63) | 382 | 4,500 | | | 4,882 |
| Cooled diluent to Reactor (73) | 131 | 1,540 | | | 1,671 |
| Ethylene feed (12) | 22 | | | | 22 |
| Catalyst (24) | | | | | 0.019 |

From the foregoing, it is seen that the instant invention provides an improved method and means for controlling the reaction temperature of a polymerization process in which the polymer produced is in finely divided form. Furthermore, it is seen that the instant invention provides a means and method for withdrawing a slurry from a closed reaction system while still permitting the maintenance of a desired pressure in the system. Another advantage of the present invention lies in the fact that higher olefin conversions are obtainable than are possible with conventional reactor systems. It will be apparent to those skilled in the art that variations and modifications can be made in the light of the foregoing disclosure. Such variations and modifications are believed to be clearly within the spirit and scope of the invention.

I claim:

1. A reactor system comprising in combination, a closed reaction vessel, a feed conduit in communication with said reaction vessel; a jet pump having inlet and discharge openings, said inlet opening being in communication with said reaction vessel; means to supply motive fluid to said jet pump; a means for treating a slurry to provide a concentrated slurry and a solid free liquid provided with a concentrated slurry outlet and a liquid outlet; a conduit extending from the discharge of said pump to said slurry treating means; a conduit extending from the concentrated slurry outlet to said reaction vessel; a product removal conduit extending from said concentrated slurry outlet; indirect heat exchange means having an inlet and an outlet; a conduit extending from liquid outlet of said slurry treating means to the inlet of said heat exchanger; and a conduit extending from the outlet of said heat exchanger to said reaction vessel.

2. A reactor system comprising in combination, a closed reaction vessel; first conduit means for introducing material into said reaction vessel; a jet pump having inlet, discharge and suction openings, said suction opening being in communication with said reaction vessel; a cyclone separator; second conduit means connecting said discharge opening of said jet pump to said cyclone separator; third conduit means connecting a lower portion of said cyclone separator to said reaction vessel; fourth conduit means for product withdrawal connected to said third conduit means; fifth conduit means connected to an upper portion of said cyclone separator; an indirect heat exchange means positioned in said fifth conduit means; sixth conduit means connecting said fifth conduit means to said inlet opening of said jet pump; and seventh conduit means connected to said fifth conduit means at a point downstream from said indirect heat exchange means, said seventh conduit means being further connected to said reaction vessel.

3. A reactor system comprising, in combination, a closed reaction vessel; a first inlet line connected to said reaction vessel; a second inlet line connected to said reaction vessel; a jet pump having inlet, discharge and suction openings; a third line connecting a lower portion of said reaction vessel to said suction opening of said jet pump; a cyclone separator; a fourth line connecting said discharge opening of said jet pump to said cyclone separator; a fifth line connecting a lower portion of said cyclone separator to an upper portion of said reaction vessel; a sixth line connected to said fifth line for product removal; a surge tank; a seventh line connecting an upper portion of said cyclone separator to an upper portion of said surge tank; an indirect heat exchanger having coolant inlet and outlet lines attached thereto; an eighth line connecting a lower portion of said surge tank to said indirect heat exchanger; a pump positioned in said eighth line; a ninth line connecting said indirect heat exchanger to said reaction vessel; and a tenth line connecting said ninth line to said inlet opening of said jet pump.

4. The reactor system of claim 3 which includes a temperature control means, said means being operatively connected to said reaction vessel and to a motor operated flow control means positioned in said coolant inlet line of said indirect heat exchanger.

5. The reactor system of claim 4 which includes first and second alternately open flow control means positioned in said sixth line; a time cycle control means, said means being operatively connected to said first and second flow control means; and a pressure control means, said means being operatively connected to said reaction vessel and to said time cycle control means so as to adjust the time cycle in response to changes in pressure in the reaction vessel.

References Cited by the Examiner
UNITED STATES PATENTS

| 2,209,346 | 7/1940  | McCausland | 23—288.4   |
| 2,271,646 | 2/1942  | Kassel     | 23—288.9 X |
| 2,453,837 | 11/1948 | Fisher et al. | 23—285  |
| 2,908,734 | 10/1959 | Cottle     | 260—683.15 |
| 3,080,354 | 3/1963  | Moon       | 260—88.2 X |

MORRIS O. WOLK, *Primary Examiner.*